United States Patent
Wang et al.

(10) Patent No.: US 11,845,117 B2
(45) Date of Patent: Dec. 19, 2023

(54) ASYNCHRONOUS ROLLING MILL WITH A SUPER LARGE DIAMETER RATIO AND SHEET ROLLING METHOD

(71) Applicant: TAIYUAN UNIVERSITY OF TECHNOLOGY, Taiyuan (CN)

(72) Inventors: Tao Wang, Taiyuan (CN); Zhiqiang Li, Taiyuan (CN); Gang Dai, Taiyuan (CN); Jianchao Han, Taiyuan (CN); Zhongkai Ren, Taiyuan (CN); Yuanming Liu, Taiyuan (CN); Qingxue Huang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/328,816

(22) Filed: Jun. 5, 2023

(65) Prior Publication Data
US 2023/0321702 A1    Oct. 12, 2023

Related U.S. Application Data

(63) Continuation of application No. PCT/CN2022/073516, filed on Jan. 24, 2022.

(30) Foreign Application Priority Data

Feb. 4, 2021  (CN) .......................... 202110159121.0

(51) Int. Cl.
*B21B 31/32* (2006.01)
*B21B 13/02* (2006.01)
(Continued)

(52) U.S. Cl.
CPC .............. *B21B 31/32* (2013.01); *B21B 13/02* (2013.01); *B21B 31/24* (2013.01)

(58) Field of Classification Search
CPC ....... B21B 31/32; B21B 31/203; B21B 35/02; B21B 35/12; B21B 39/006; B21B 13/02; B21B 13/04
(Continued)

(56) References Cited

U.S. PATENT DOCUMENTS 4,478,064 A    10/1984  Brenneman
6,035,687 A *   3/2000  Grimmel ................. B21B 31/32
                                                         72/245
(Continued)

FOREIGN PATENT DOCUMENTS

CN         2496572 Y     6/2002
CN       202762725 U     3/2013
(Continued)

OTHER PUBLICATIONS

English translate (JPS5542151A), retrieved date Aug. 7, 2023.*
Internation Search Report of PCT/CN2022/073516, dated May 11, 2022.

*Primary Examiner* — Matthew Katcoff
*Assistant Examiner* — Mohammed S. Alawadi (57) ABSTRACT

An asynchronous rolling mill with a super large diameter ratio comprises a rolling mill stand, a press-down device, a balancing device, an upper roll system, and an arc-shaped plate device. The arc-shaped plate device comprises an arc-shaped plate, the arc-shaped plate is arranged opposite to the upper roll, and the arc-shaped plate and the upper roll are cooperated to roll strips. The present disclosure also provides a method for rolling a strip using an asynchronous rolling mill with a super large diameter ratio. The asynchronous rolling mill can roll with super large diameter ratio and different speeds, and has a large angle to engage, thereby reducing the external friction force of a workpiece and improving strip forming quality.

6 Claims, 10 Drawing Sheets

(51) Int. Cl.
*B21B 31/24* (2006.01)
*B21B 39/16* (2006.01)

(58) Field of Classification Search
USPC .................................. 72/190, 196, 197, 232
See application file for complete search history.

(56) References Cited

U.S. PATENT DOCUMENTS

| | | | | |
|---|---|---|---|---|
| 6,895,794 | B2 * | 5/2005 | Yamamoto | ............... B21B 31/16 |
| | | | | 72/247 |
| 2002/0014099 | A1 | 2/2002 | Norikura | |
| 2003/0188559 | A1 * | 10/2003 | Narushima | ......... B21B 15/0035 |
| | | | | 72/187 |

FOREIGN PATENT DOCUMENTS

| | | |
|---|---|---|
| CN | 202824121 U | 3/2013 |
| CN | 205362229 U | 7/2016 |
| CN | 106391700 A | 2/2017 |
| CN | 106944479 A | 7/2017 |
| CN | 108043880 A | 5/2018 |
| CN | 108126981 A | 6/2018 |
| CN | 207565105 U | 7/2018 |
| CN | 207668230 U | 7/2018 |
| CN | 108637015 A | 10/2018 |
| CN | 209680806 U | 11/2019 |
| CN | 111389907 A | 7/2020 |
| JP | S5542151 A * | 3/1980 |
| JP | S5542151 A | 3/1980 |
| JP | 2009000699 A | 1/2009 |
| JP | 2010011820 A | 1/2010 |

* cited by examiner

ASYNCHRONOUS ROLLING MILL WITH A SUPER LARGE DIAMETER RATIO AND SHEET ROLLING METHOD

CROSS-REFERENCE TO RELATED APPLICATIONS

This application is a continuation of International Patent Application No. PCT/CN2022/073516 with a filing date of Jan. 24, 2022, designating the United States, now pending, and further claims priority to Chinese Patent Application No. 202110159121.0 with a filing date of Feb. 4, 2021. The content of the aforementioned applications, including any intervening amendments thereto, are incorporated herein by reference.

TECHNICAL FIELD

The disclosure belongs to the technical field of strip processing device, and in particular relates to an asynchronous rolling mill with a super large diameter ratio and a rolling method.

BACKGROUND

The rolling mill is one kind of machine which can deform the metal under strong pressure to obtain the required shape of the material and which can be used to manufacture various modeling materials and blanks. In the production, improving the production quality of strips, reducing production costs, and improving production efficiency are the requirements of a rolling mill. Most traditional rolling mills include two work rolls and several backup rolls. The workpiece moves to the rolling area with the frictional force coming from two work rolls. In the rolling area, the rolling force coming from two work rolls is applied on the workpiece, and the workpiece is plastically deformed to the required shape.

With the demands of production, the rolling mill having rolls with different diameters came into being, which is different from rolling with different linear speeds of the two rolls. A smaller work roll is used by rolling with different diameter to significantly reduce rolling pressure and energy consumption, and another larger work roll is used to transmit torque and provide engagement capacity, and to improve thickness accuracy and strip quality. In this way, rolling with large pressure can be achieved in the production of thin strip, and the process and its device can be simplified, energy consumption can be saved, and product quality and milling production capacity can be improved. The traditional rolling mill having rolls with different diameter is made by making the diameter of one of the work rolls smaller. This method weakens the stiffness of the rolls and has a small diameter ratio.

In JPS5542151A, a rolling mill with an infinite diameter ratio is made by replacing the lower roll with a flat plate. However, changing the lower roll into a flat plate increases the friction between the roll and the workpiece during the rolling process, and makes the surface of the workpiece easy to tear, resulting in poor surface quality of the strip after rolling, and is also difficult for the workpiece to engage. Since the workpiece is driven by the flat plate, slippage may also occur during rolling, resulting in inaccurate speed ratio.

The main reason for reducing the rolling pressure and energy consumption during different-speed rolling is due to the reduction of the length of the deformation zone while rolling, that is, the large reduction of the contact area and the significant reduction of the unit pressure. The reduction of unit pressure is mainly due to the fact that the ratio of the horizontal component of the positive pressure to the positive pressure during rolling with rolls of different diameter is larger than that during rolling with generally symmetrical rolls with same diameter, which reduces the influence coefficient of the stress state, that is, the body stress state is weakened.

In addition, rolling with different speed is also required in actual production, but traditional rolling mills generally control the different speeds of two rolls by a gearbox. This kind of rolling mill is difficult to adjust the speed ratio and cannot achieve large speed ratio during rolling.

SUMMARY

In view of the above problems, the present disclosure provides an asynchronous rolling mill with a super large diameter ratio, which can roll with different diameter and different speed, and both the diameter ratio and the speed ratio can be adjusted in a wide range, which effectively solves the problems of the large friction force, engagement difficulty and slippage of the above-mentioned rolling mill, and can reduce the warpage of the strip after rolling significantly. Compared with the traditional rolling mill having rolls with different diameter, the diameter ratio range has been improved significantly, which can effectively reduce the rolling force of the rolling mill and further reduce the energy consumption. Besides, it can also enhance the shearing effect, improve the plastic deformation, and ensure accurate speed ratio.

For the above purpose, the present disclosure provides the following technical solutions:

An asynchronous rolling mill with a super large diameter ratio, including a rolling mill stand, a press-down device, a balancing device, an upper roll system and an arc-shaped plate device;

the press-down device includes two pressing hydraulic cylinders;

the balancing device includes a lower balancing beam, a balancing rod, an upper balancing beam, a balancing hydraulic cylinder and a connecting frame, and two balancing beam rods are respectively connected with the upper balancing beam and the lower balancing beam by pins, and the balancing hydraulic cylinder is installed on the rolling mill stand through the connecting frame, and two ends of the connecting frame are provided with guide sleeve to keep the balancing rod in a vertical state, and an upward force is applied on the upper balancing beam through the balancing hydraulic cylinder and the upward force is transmitted to the lower balancing beam through the balancing rod;

the upper roll system includes an upper roll and two upper roll bearing seats, the two upper roll bearing seats are installed on the rolling mill stand, and the two upper roll bearing seats are respectively installed at both ends of the upper roll, and the two pressing hydraulic cylinders in the press-down device act on upper surfaces of the two upper roll bearing seats through spherical spacer respectively, and the two upper roll bearing seats are connected with the lower balancing beam in the balancing device;

the arc-shaped plate device comprises an arc-shaped plate, the arc-shaped plate is arranged opposite to the upper roll, and the arc-shaped plate and the upper roll are cooperated to roll strips.

Further, the arc-shaped plate device further includes a drive component, which is installed on the rolling mill stand and is used to drive the arc-shaped plate to move reciprocally.

Still further, the drive component includes a gear and a transmission shaft, and the gear is installed on the transmission shaft, the transmission shaft is installed on the rolling mill stand through a bearing; the arc-shaped plate includes a base plate, a cover plate and a rack, the base plate and the cover plate are stacked and detachably connected, the rack is welded or integrated with the base plate, and the rack is connected to the gear; the base plate is made of carbon steel or high-strength steel, and the cover plate is made of high-strength steel or wear-resistant steel.

Further, a plurality of support shafts are symmetrically arranged on the left and right sides of the transmission shaft, and the support shafts are slidably fit with the rolling mill stand, and a height adjustment mechanism is provided below both ends of the support shaft to adjust the height of the support shaft, and the height adjustment mechanism is installed on the rolling mill stand, support convexes are symmetrically provided on both sides of the rack, the support convexes are fixedly arranged on the base plate, and the transmission shaft and the support bearings corresponding to the support convexes are provided on the support shafts.

Further, the height adjustment mechanism comprises a spacer, a pressing screw, a worm gear, a worm and an adjusting wheel, the adjusting wheel is fit with the worm, the worm gear is fit with the worm, and the pressing screw is connected with the worm gear by splines, the pressing screw is fit with the rolling mill stand through a threaded pair, and the spacer is placed between the pressing screw and the support shaft; the worm is driven to rotate by rotating the adjusting wheel, thereby rotating the worm gear, and the worm gear drives the pressing screw to rotate, and the pressing screw rotates along thread to ascend or descend, thereby completing height adjustment of the support shaft.

Furthermore, a stabilizing device is provided on both outlet side and inlet side of the rolling mill stand to stabilize the arc-shaped plate during rolling, the stabilizing device includes a stabilizing stand, an upper pressing roll, a lower pressing roll, an upper pressing roll bearing seat, and a lower pressing roll bearing seat and a adjusting hydraulic cylinder, the upper pressing roll and the lower pressing roll are respectively installed on the upper pressing roll bearing seat and the lower pressing roll bearing seat, the upper pressing roll bearing seat and the lower pressing roll bearing seat are slidably fit with the stabilizing stand, and the adjusting hydraulic cylinder is provided above the upper pressing roll bearing seat and below the lower pressing roll bearing seat, cylinder body of the adjusting hydraulic cylinder is installed on the stabilizing stand, and piston rod of the adjusting hydraulic cylinder is connected with the corresponding upper pressing roll bearing seat or the lower pressing roll bearing seat, and height and gap between the upper pressing roll and the lower pressing roll can be adjusted by expansion and contraction of the piston rod of the hydraulic cylinder to adapt to the arc-shaped plates with different radii and thicknesses.

Furthermore, the height adjustment mechanism is a gear-and-rack driving mechanism, a hydraulic cylinder driving mechanism or a linear motor driving mechanism.

Furthermore, the upper roll and the transmission shaft are respectively connected with a power device to roll with a large speed ratio.

Still further, the lower width of the rolling mill stand is greater than the upper width of the rolling mill stand.

A method for rolling a strip using the super large diameter ratio asynchronous rolling mill of claim 1, including the following steps:

step 1. Selecting the arc-shaped plate (4) with a suitable radius based on process requirements, and adjusting a height adjustment mechanism to adapt to the radius of the arc-shaped plate (4);

step 2. Applying lubricating oil or release agent on the arc-shaped plate (4), and adjusting the rotation speed of the upper roll (2) and the arc-shaped plate (4) based on the process requirements;

step 3. Adjusting height of the upper roll (2) based on initial thickness and rolling reduction of a workpiece to adjust a gap between the upper roll (2) and the arc-shaped plate (4);

step 4. Driving the upper roll (2) to rotate and when the rotation speed of the upper roll (2) is stable, driving the arc-shaped plate (4) to rotate around its rotational center by a drive component, so that the workpiece smoothly moves to rolling area for rolling.

Compared with the prior art, the present disclosure has the following advantages:

1. The rolling mill of the disclosure can be rolled with rolls of different diameter and different speed. The diameter ratio and the speed ratio can be adjusted in a wide range, which effectively solves the problem of large friction force, engagement and slippage difficulty of the rolling mill in the application of JPS5542151A, and has a very significant effect on reducing the warpage of the strip after rolling. Compared with the traditional rolling mill, the diameter ratio range is significantly increased, which can effectively reduce the rolling force of the rolling mill, and further reduce energy consumption, and can also enhance shear effect, improve plastic deformation ability, and ensure accurate speed ratio.

2. The disclosure adopts multiple multi-point supports and gear-and-rack transmission. The supports are supported by multiple support bearings at multiple points at the same time, which disperses the rolling force and increases the upper limit of the rolling force that can be tolerated. The driving mode is gear-and-rack drive, increasing the torque, and multi-point support and gear-and-rack drive mode is more compact than the traditional rolling mill.

3. In the present disclosure, the radius of the arc-shaped plate can be changed by replacing the arc-shaped plates with different radii and adjusting the height of the support shaft to match the radius of the arc-shaped plate, and also the diameter ratio of the rolling mill can be adjusted by replacing the upper rolls with different diameters and the arc-shaped plate.

4. The arc-shaped plate of the present disclosure includes a base plate and a cover plate, and the base plate are detachably connected with the cover plate, and the cover plate can be replaced independently after the cover plate is worn, which greatly saves resources.

5. In the disclosure, support convexes are arranged on both sides of the rack, and the arc-shaped plate is supported by the cooperation of the support convexes and the support bearing. The rack and gear are only used for transmission and do not bear the rolling force, thereby greatly reducing the wear of the rack and gear.

BRIEF DESCRIPTION OF DRAWINGS

wherein, rolling mill stand—1, upper roll—2, upper roll bearing seat—3, arc-shaped plate—4, gear—5, transmission shaft—6, support shaft—7, support bearing—8, spacer—9, pressing screw—10, worm gear—11, worm—12, adjusting wheel—13, stabilizing stand—14, upper pressing roll—15, lower pressing roll—16, upper pressing roll bearing seat—17, lower pressing roll bearing seat—18, adjusting hydraulic cylinder—19, press-down device—20, balancing device—21, scale—22, spherical spacer—23, base plate—401, cover plate—402, rack—403, support convex—404, pressing hydraulic cylinder—2001, lower balancing beam—2101, balancing rod—2102, upper balancing beam—2103, balancing hydraulic cylinder—2104, connecting frame—2105.

DESCRIPTION OF EMBODIMENTS

In order to further illustrate the technical solutions of the present disclosure, the present disclosure will be further described below by the embodiments below.

As shown in FIGS. 1 to 13, an asynchronous rolling mill with a super large diameter ratio is characterized by including a rolling mill stand 1, a press-down device 20, a balancing device 21, an upper roll system and an arc-shaped plate device.

Figure 1:
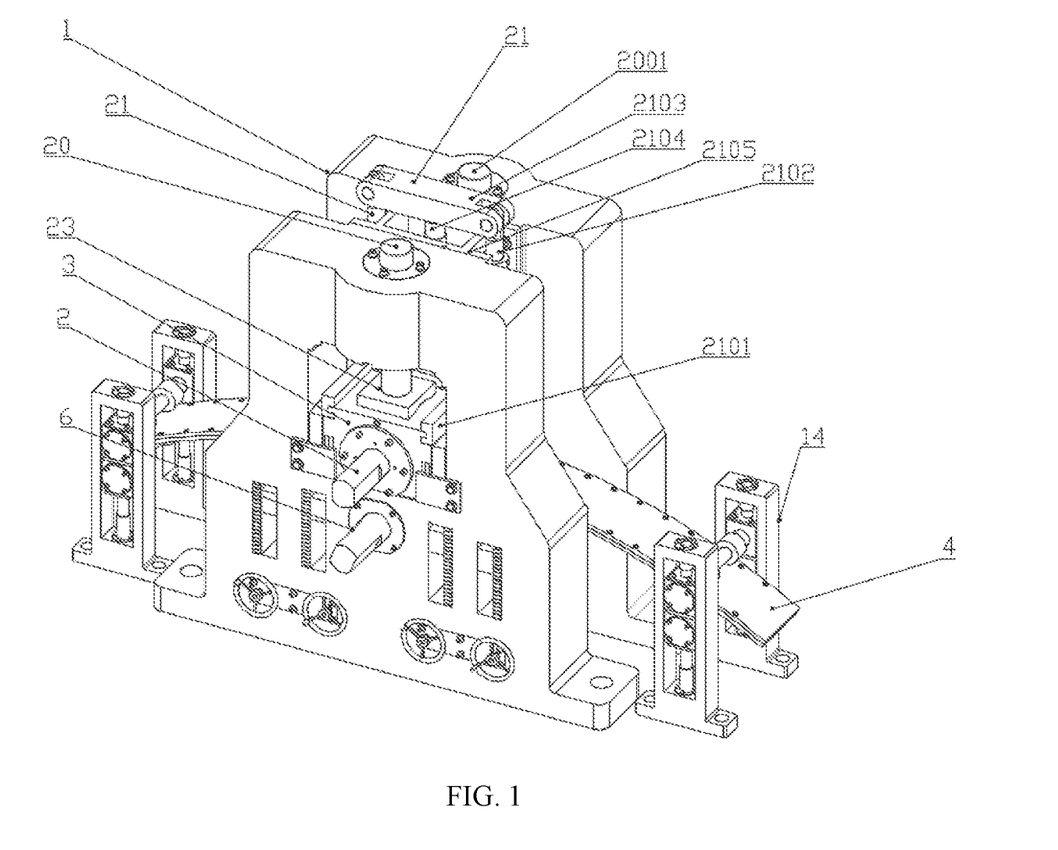
FIG. 1 is the schematic structural diagram of the present disclosure.
Figure 2:
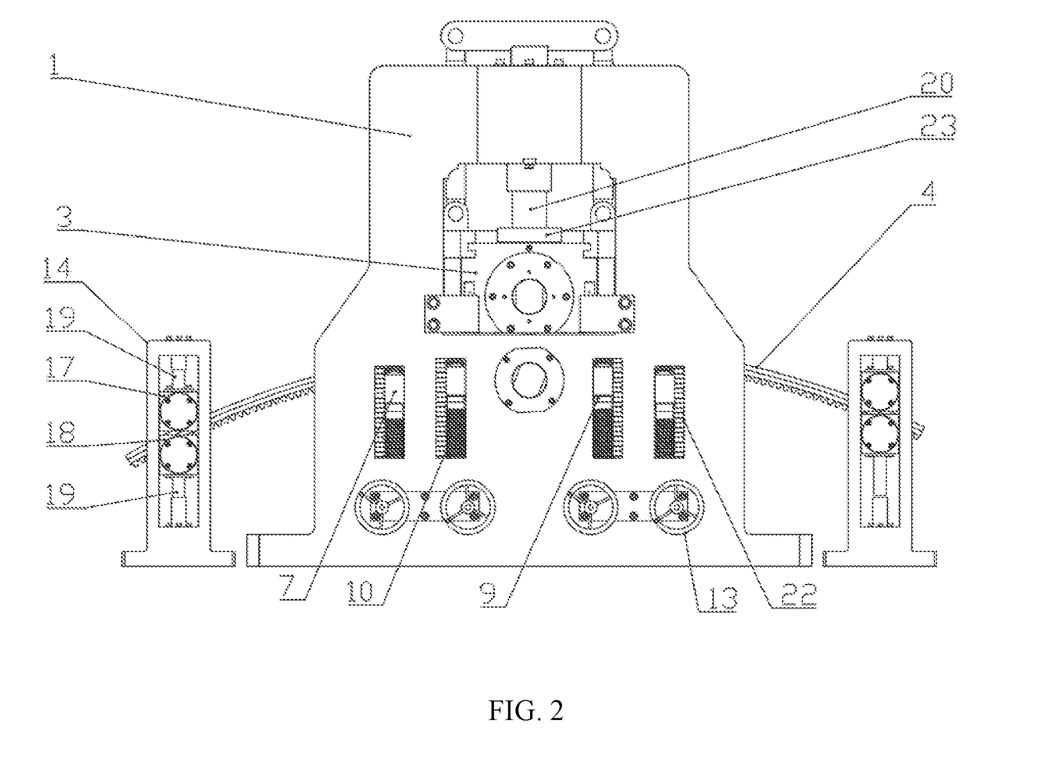
FIG. 2 is the front view of the present disclosure.
Figure 3:
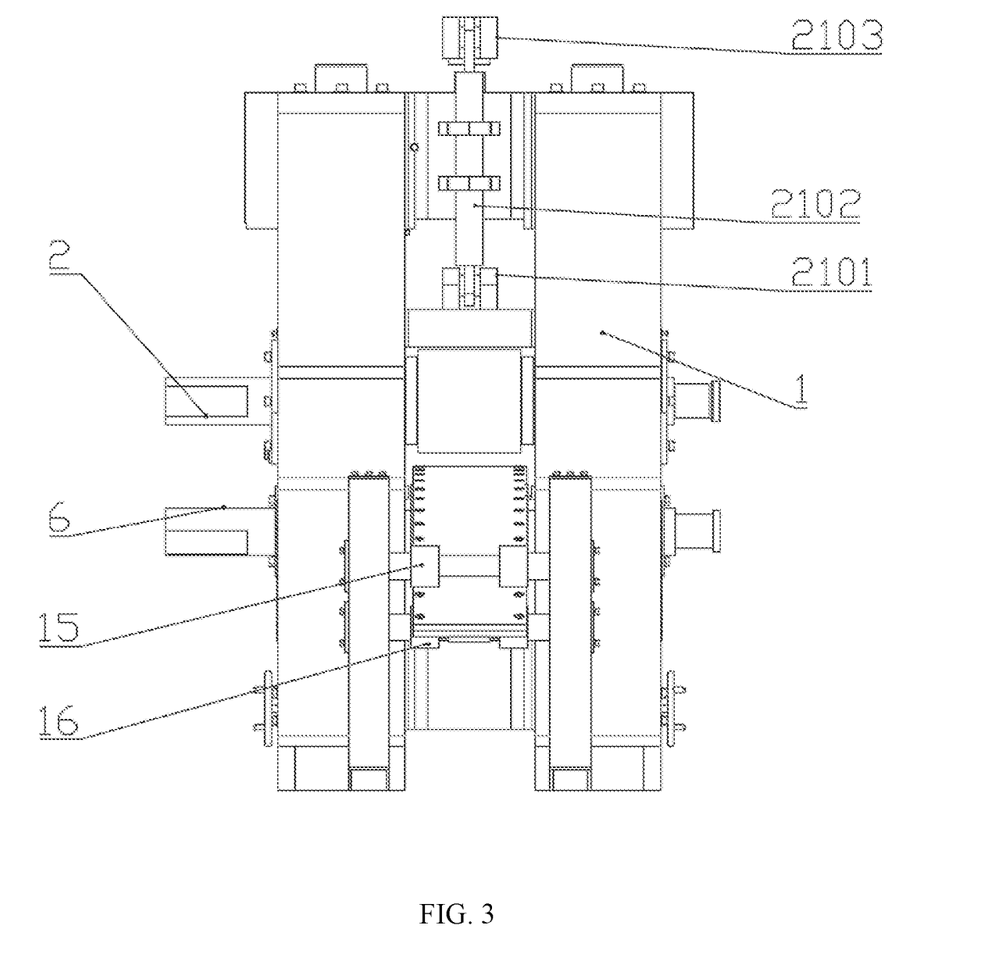
FIG. 3 is the side view of the present disclosure.

The lower width of the rolling mill stand 1 is larger than the upper width of the rolling mill stand 1.

The press-down device 20 includes two pressing hydraulic cylinders 2001.

The balancing device 21 includes a lower balancing beam 2101, balancing rods 2102, an upper balancing beam 2103, a balancing hydraulic cylinder 2104 and a connecting frame 2105. Two balancing rods 2102 are respectively connected with the upper balancing beam 2103 and the lower balancing beam 2101 by pins. The balancing hydraulic cylinder 2104 is installed on the rolling mill stand 1 by the connecting frame 2105. Two ends of the connecting frame 2105 are provided with guide sleeves, which can keep the balancing rod 2102 in a vertical state. An upward force is applied on the upper balancing beam 2103 through the balancing hydraulic cylinder 2104. The force is transmitted to the lower balancing beam 2101 through the balancing rod 2102.

The upper roll system includes an upper roll 2 and two upper roll bearing seats 3 which are installed on the rolling mill stand 1, and two upper roll bearing seats 3 are respectively installed at both ends of the upper roll 2. The two pressing hydraulic cylinders 2001 in the press-down device 20 act on upper surfaces of the two upper roll bearing seats 3 through spherical spacer 23 respectively. The two upper roll bearing seats 3 are connected with the lower balancing beam 2101 in the balancing device 21.

Figure 6:
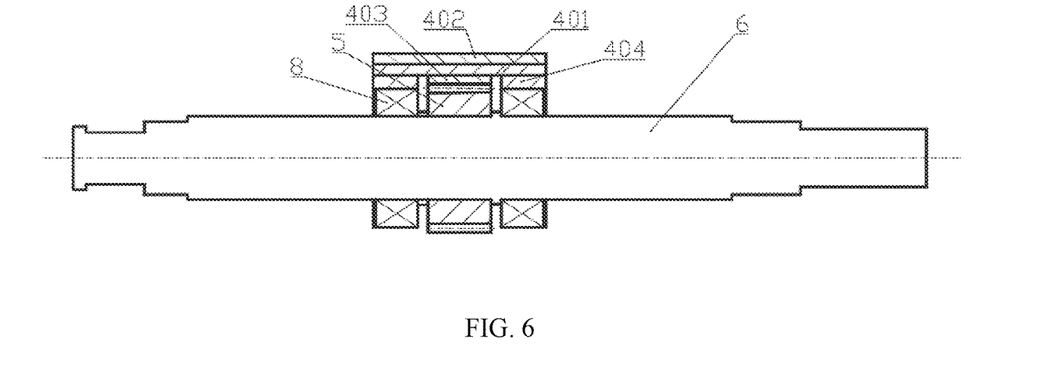
FIG. 6 is the schematic diagram shown the connection between the arc-shaped plate and the transmission shaft of the present disclosure.
Figure 7:
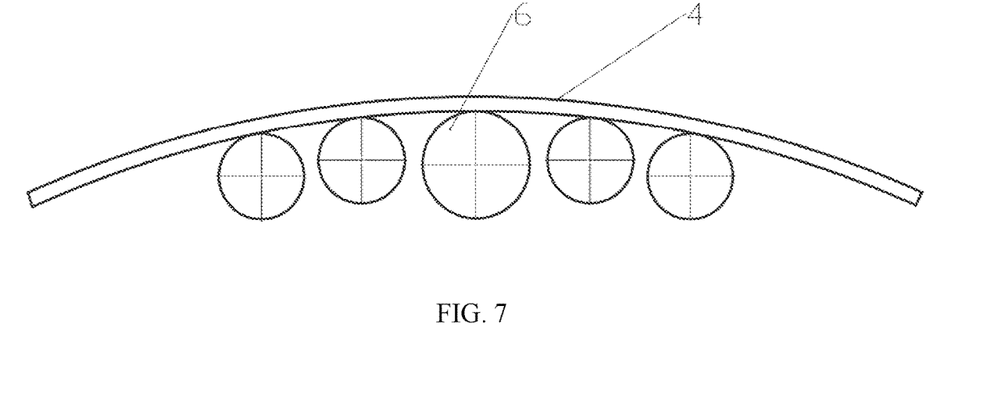
FIG. 7 is a schematic diagram of the radius adjustment of the arc-shaped plate of the present disclosure.
Figure 8:
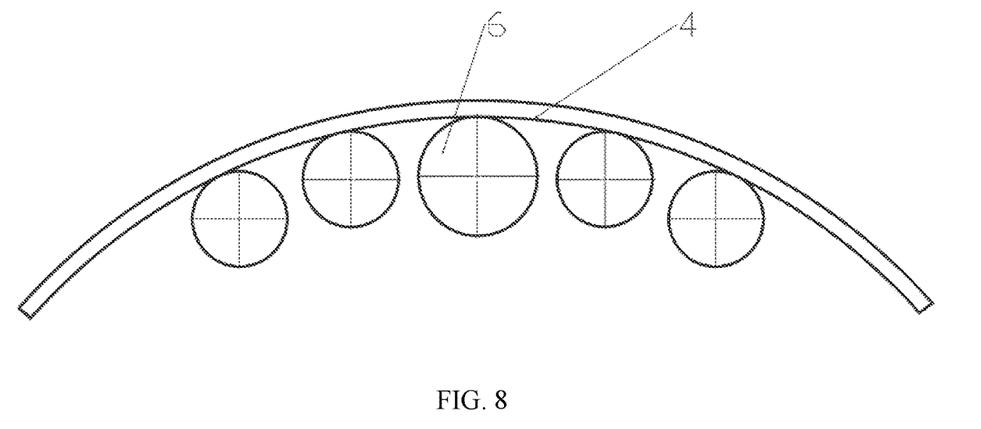
FIG. 8 is a schematic diagram of the radius adjustment of the arc-shaped plate of the present disclosure.
Figure 9:
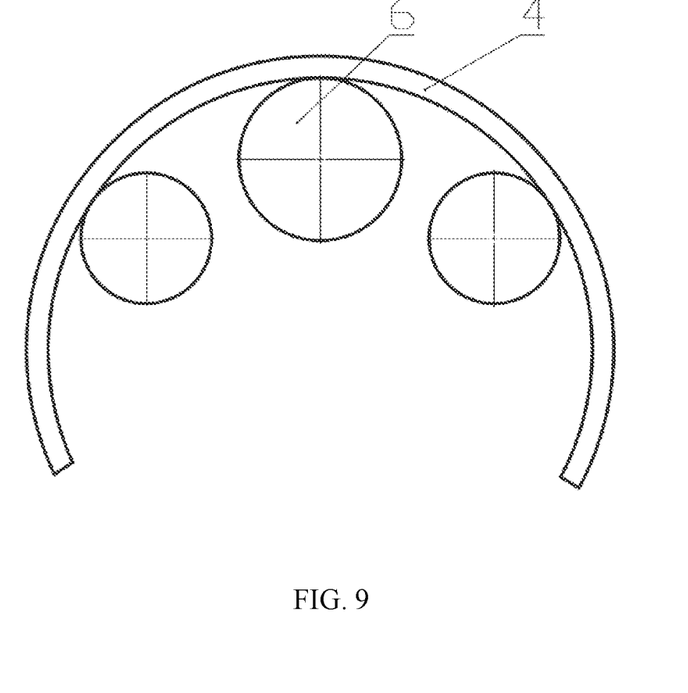
FIG. 9 is a schematic diagram of the radius adjustment of the arc-shaped plate of the present disclosure.
Figure 10:
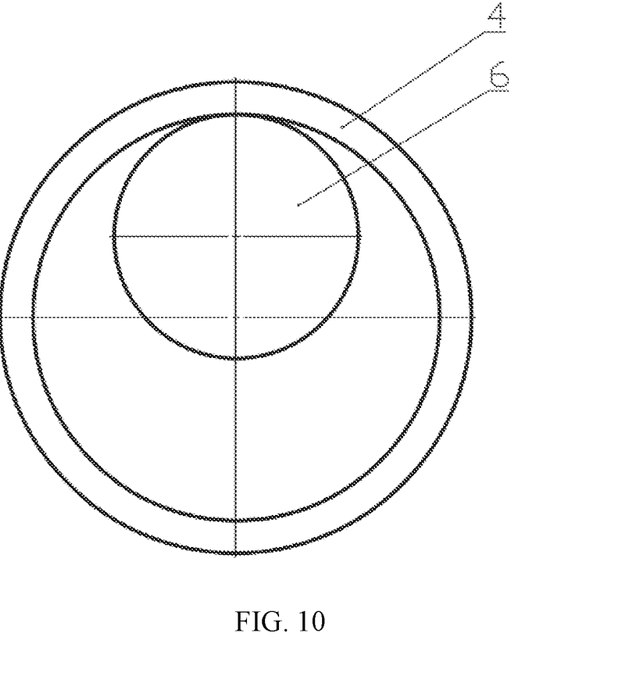
FIG. 10 is a schematic diagram of the radius adjustment of the arc-shaped plate of the present disclosure.

The arc-shaped plate device includes an arc-shaped plate 4 which includes a base plate 401, a cover plate 402 and a rack 403. The base plate 401 and the cover plate 402 are stacked and detachably connected, and the rack 403 is welded or integrally formed with the base plate 401, and support convexes 404 are symmetrically arranged on both sides of the rack 403. The support convexes 404 are fixedly arranged on the base plate 401, and the base plate 401 is made of carbon steel or high-strength steel. The cover plate 402 is made of high-strength steel or wear-resistant steel. The arc-shaped plate 4 is arranged opposite to the upper roll 2, and the arc-shaped plate 4 is cooperated with the upper roll 2 to roll the strip.

Figure 4:
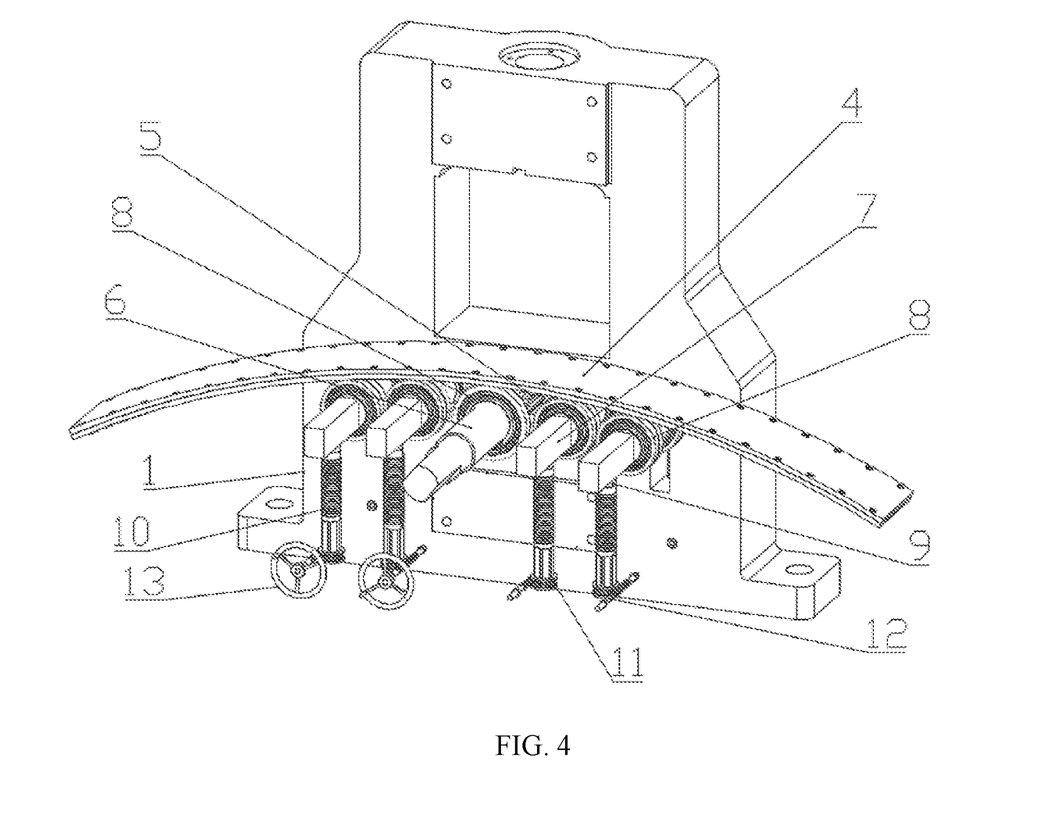
FIG. 4 is a schematic structural diagram of the present disclosure with a rolling mill stand removed.
Figure 5:
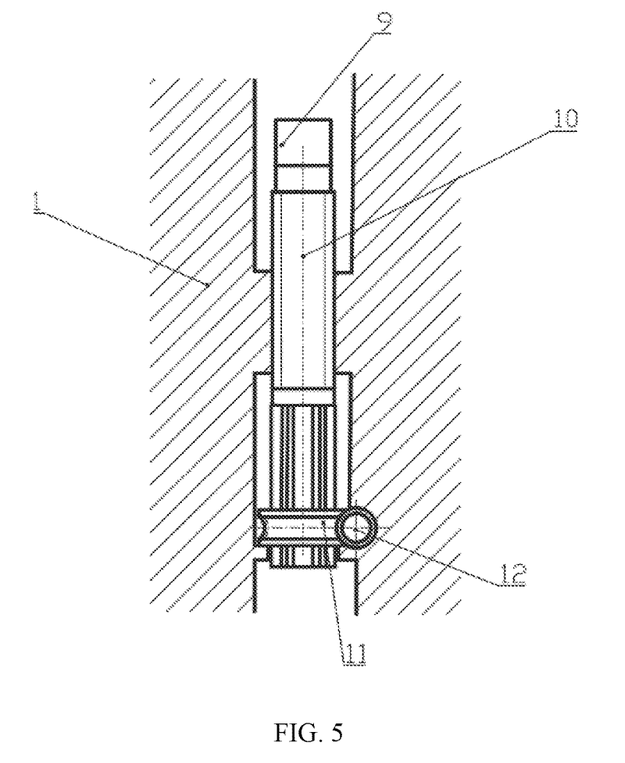
FIG. 5 is the schematic diagram shown the installment of the height adjustment mechanism of the present disclosure.

The arc-shaped plate device further includes a drive component which is installed on the rolling mill stand 1, and the drive component includes a gear 5 and a transmission shaft 6. The gear 5 is installed on the transmission shaft 6, and the rack 403 is engaged with the gear 5. The transmission shaft 6 is installed on the rolling mill stand 1 through bearings. The upper roll 2 and the transmission shaft 6 are respectively connected to a power device, and several support shafts 7 are symmetrically arranged on the left and right sides of the transmission shaft 6. The support shafts 7 are slidably fit with the rolling mill stand 1, and support bearings 8 corresponding to the support convexes 404 are provided on the transmission shaft 6 and the support shaft 7. A height adjustment mechanism is provided below both ends of the support shaft 7 to adjust the height of the support shaft 7. The height adjustment mechanism includes a pad 9, a pressing screw 10, a worm gear 11, a worm 12 and an adjusting wheel 13. The adjusting wheel 13 is connected with the worm 12, and the worm gear 11 is fit with the worm 12, the pressing screw 10 is connected with the worm gear 11 by splines, and the pressing screw 10 is fit with the rolling mill stand 1 by a threaded pair, and the spacer 9 is placed between the pressing screw 10 and the support shaft 7. The worm 12 is driven to rotate by rotating the adjusting wheel 13, thereby rotating the worm gear 11, and the worm gear 11 drives the pressing screw 10 to rotate, and the pressing screw 10 rotates along thread to ascend or descend, thereby completing height adjustment of the support shaft 7. A scale 22 is provided on the rolling mill stand 1 to facilitate the precise adjustment of the height adjustment mechanism.

Figure 11:
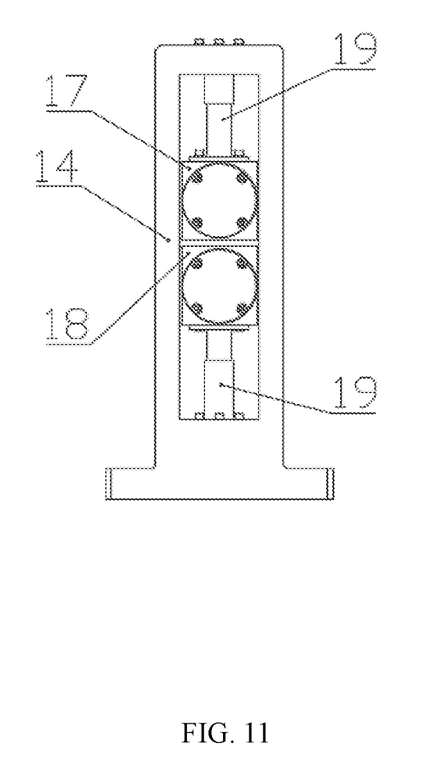
FIG. 11 is a front view of the stabilizing device of the present disclosure.
Figure 12:
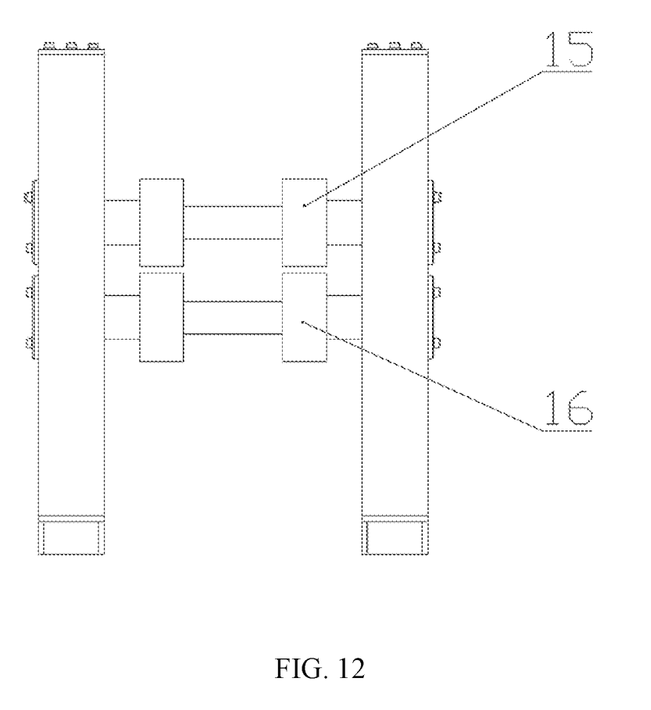
FIG. 12 is a side view of the stabilizing device of the present disclosure.
Figure 13:
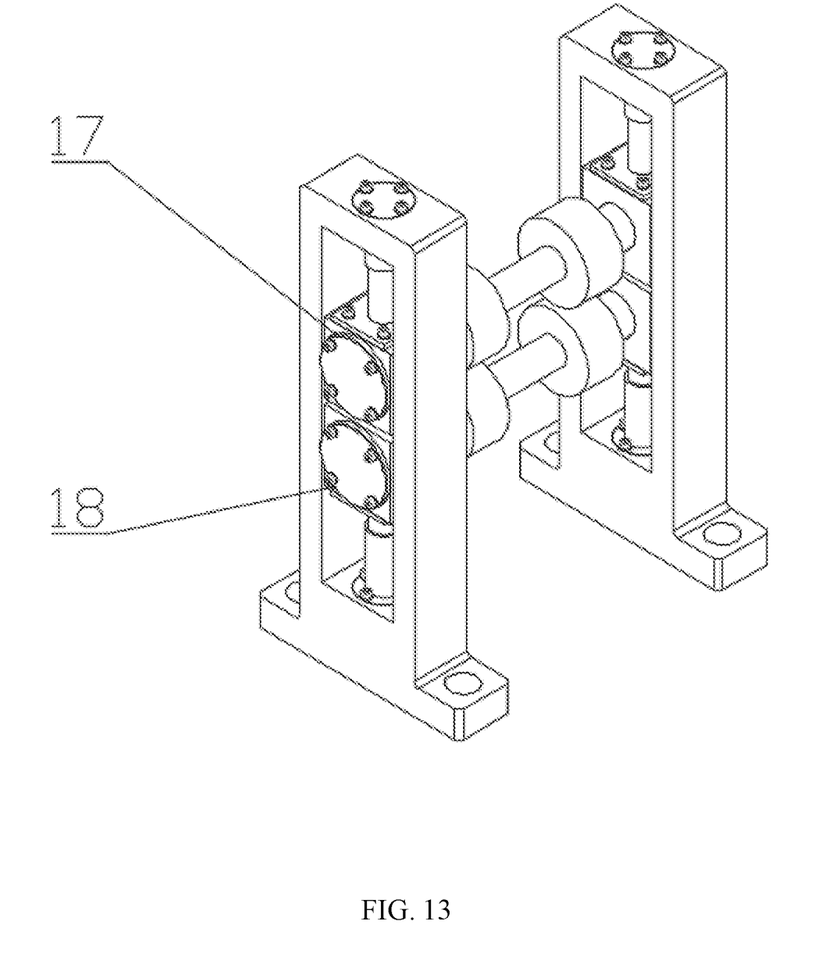
FIG. 13 is a schematic structural diagram of the stabilizing device of the present disclosure.

A stabilizing device is provided on both outlet side and inlet side of the rolling mill stand 1 to stabilize the arc-shaped plate 4 during rolling. The stabilizing device includes a stabilizing stand 14, upper pressing roll 15, lower pressing roll 16, upper pressing roll bearing seat 17, lower pressing roll bearing seat 18 and the adjusting hydraulic cylinder 19. The upper pressing roll 15 and the lower pressing roll 16 are respectively installed on the upper pressing roll bearing seat 17 and the lower pressing roll bearing seat 18. The upper pressing roll bearing seat 17 and the lower pressing roll bearing seat 18 are slidably fit with the stabilizing stand 14. Adjusting hydraulic cylinders 19 is provided above the upper pressing roll bearing seat 17 and below the lower pressing roll bearing seat 18. The cylinders of the adjusting hydraulic cylinders 19 are installed on the stabilizing stand 14, and the piston rods of the adjusting hydraulic cylinders 19 are connected with the corresponding upper pressing roll bearing seat 17 or the lower pressing roll bearing seat 18.

Height and gap of the upper pressing roll 15 and the lower pressing roll 16 can be adjusted by expansion and contraction of piston rod of the adjusting hydraulic cylinder 19, and then can adapt to the arc-shaped plate 4 with different radii and thicknesses.

A method for rolling a strip, including the following steps:

Step 1. Selecting the arc-shaped plate 4 with a suitable radius based on process requirements, and adjusting a height adjustment mechanism to adapt to the radius of the arc-shaped plate 4;

Step 2. Applying lubricating oil or release agent on the arc-shaped plate 4, and adjusting the rotation speed of the upper roll 2 and the arc-shaped plate 4 based on process requirements;

Step 3. Adjusting height of the upper roll 2 based on the initial thickness and rolling reduction of a workpiece to adjust a gap between the upper roll 2 and the arc-shaped plate 4;

Step 4. Driving the upper roll 2 to rotate and when the rotation speed of the upper roll 2 is stable, driving the arc-shaped plate 4 to rotate around its rotational center by a drive component, so that the workpiece smoothly moves to rolling area for rolling.

In the above embodiment, the height adjustment mechanism may also be a gear-and-rack driving mechanism, a hydraulic cylinder driving mechanism or a linear motor driving mechanism.

While the main features and advantages of the present disclosure have been shown and described above, it will be apparent to those skilled in the art that the present disclosure is not limited to the details of the above-mentioned exemplary embodiments, and without departing from the spirit or essential characteristics of the present disclosure, the present disclosure may be implemented in other specific forms. Therefore, the embodiments are to be regarded in all respects as illustrative and not restrictive, and the scope of the disclosure is to be defined by the appended claims rather than the foregoing description, therefore all changes falling within the meaning and scope of the equivalents of the scope of the claims are included in the present disclosure.

In addition, it should be understood that although this specification is described in terms of embodiments, not each embodiment only includes an independent technical solution, and this description in the specification is only for the sake of clarity, and those skilled in the art should take the specification as a whole, and the technical solutions in each embodiment can also be appropriately combined to form other implementations that can be understood by those skilled in the art.

What is claimed is:

1. An asynchronous rolling mill with a super large diameter ratio, including a rolling mill stand (1), a press-down device (20), a balancing device (21), an upper roll system and an arc-shaped plate device;

the press-down device (20) includes two pressing hydraulic cylinders (2001);

the balancing device (21) includes a lower balancing beam (2101), balancing rods (2102), an upper balancing beam (2103), a balancing hydraulic cylinder (2104) and a connecting frame (2105), and two balancing beam rods (2102) are respectively connected with the upper balancing beam (2103) and the lower balancing beam (2101) by pins, and the balancing hydraulic cylinder (2104) is installed on the rolling mill stand (1) through the connecting frame (2105), and two ends of the connecting frame (2105) are provided with guide sleeve to keep the balancing rod (2102) in a vertical state, and an upward force is applied on the upper balancing beam (2103) through the balancing hydraulic cylinder (2104) and the upward force is transmitted to the lower balancing beam (2101) through the balancing rod (2102);

the upper roll system includes an upper roll (2) and two upper roll bearing seats (3), the two upper roll bearing seats (3) are installed on the rolling mill stand (1), and the two upper roll bearing seats (3) are respectively installed at both ends of the upper roll (2), and the two pressing hydraulic cylinders (2001) in the press-down device (20) act on upper surfaces of the two upper roll bearing seats (3) through spherical spacer (23) respectively, and the two upper roll bearing seats (3) are connected with the lower balancing beam (2101) in the balancing device (21);

the arc-shaped plate device includes an arc-shaped plate (4) and a drive component, the arc-shaped plate (4) is arranged opposite to the upper roll (2), and the arc-shaped plate (4) and the upper roll (2) are cooperated to roll strips;

the drive component is installed on the rolling mill stand (1) to drive the arc-shaped plate (4) to move reciprocally; the drive component includes a gear (5) and a transmission shaft (6), and the gear (5) is installed on the transmission shaft (6), the transmission shaft (6) is installed on the rolling mill stand (1) through a bearing; the arc-shaped plate (4) includes a base plate (401), a cover plate (402) and a rack (403), the base plate (401) and the cover plate (402) are stacked and detachably connected, the rack (403) is welded or integrated with the base plate (401), and the rack (403) is connected to the gear (5); the base plate (401) is made of carbon steel or high-strength steel, and the cover plate (402) is made of high-strength steel or wear-resistant steel, a plurality of support shafts (7) are symmetrically arranged on the left and right sides of the transmission shaft (6), and the support shafts (7) are slidably fit with the rolling mill stand (1), and a height adjustment mechanism is provided below both ends of the support shaft (7) to adjust the height of the support shaft (7), and the height adjustment mechanism is installed on the rolling mill stand (1), support convexes (404) are symmetrically provided on both sides of the rack (403), the support convexes (404) are fixedly arranged on the base plate (401), and the transmission shaft (6) and support bearings (8) corresponding to the support convexes (404) are provided on the support shafts (7);

a stabilizing device is provided on both outlet side and inlet side of the rolling mill stand (1) to stabilize the arc-shaped plate (4) during rolling, the stabilizing device includes a stabilizing stand (14), an upper pressing roll (15), a lower pressing roll (16), an upper pressing roll bearing seat (17), and a lower pressing roll bearing seat (18) and a adjusting hydraulic cylinder (19), the upper pressing roll (15) and the lower pressing roll (16) are respectively installed on the upper pressing roll bearing seat (17) and the lower pressing roll bearing seat (18), the upper pressing roll bearing seat (17) and the lower pressing roll bearing seat (18) are slidably fit with the stabilizing stand (14), and the adjusting hydraulic cylinder (19) is provided above the upper pressing roll bearing seat (17) and below the lower pressing roll bearing seat (18), cylinder body of the adjusting hydraulic cylinder (19) is installed on the stabilizing stand (14), and piston rod of the adjusting hydraulic cylinder (19) is connected with the corresponding upper pressing roll bearing seat (17) or the lower pressing roll bearing seat (18), and height and gap between the upper pressing roll (15) and the lower pressing roll (16) can be adjusted by expansion and contraction of the piston rod of the hydraulic cylinder (19) to adapt to the arc-shaped plates (4) with different radii and thicknesses.

2. The asynchronous rolling mill with the super large diameter ratio according to claim 1, the height adjustment mechanism comprises a spacer (9), a pressing screw (10), a worm gear (11), a worm (12) and an adjusting wheel (13), the adjusting wheel (13) is fit with the worm (12), the worm gear (11) is fit with the worm (12), and the pressing screw (10) is connected with the worm gear (11) by splines, the pressing screw (10) is fit with the rolling mill stand (1) through a threaded pair, and the spacer (9) is placed between the pressing screw (10) and the support shaft (7); the worm (12) is driven to rotate by rotating the adjusting wheel (13), thereby rotating the worm gear(11), and the worm gear(11) drives the pressing screw (10) to rotate, and the pressing screw (10) rotates along thread to ascend or descend, thereby completing a height adjustment of the support shaft (7).

3. The asynchronous rolling mill with the super large diameter ratio according to claim 1, wherein the height adjustment mechanism is a gear-and-rack driving mechanism, a hydraulic cylinder driving mechanism or a linear motor driving mechanism.

4. The asynchronous rolling mill with the uper large diameter ratio according to claim 1, the upper roll (2) and the transmission shaft (6) are respectively connected with a power device to roll with a large speed ratio.

5. The asynchronous rolling mill with the super large diameter ratio according to claim 1, lower width of the rolling mill stand (1) is larger than upper width of the rolling mill stand (1).

6. A method for rolling the roll strips using the asynchronous rolling mill with the super large diameter ratio of claim 1, including the following steps:

step 1. selecting the arc-shaped plate (4) with a suitable radius based on process requirements, and adjusting the height adjustment mechanism to adapt to the radius of the arc-shaped plate (4);

step 2. applying lubricating oil or release agent on the arc-shaped plate (4), and adjusting rotation speed of the upper roll (2) and the arc-shaped plate (4) based on the process requirements;

step 3. adjusting height of the upper roll (2) based on initial thickness and rolling reduction of a workpiece to adjust a gap between the upper roll (2) and the arc-shaped plate (4);

step 4. driving the upper roll (2) to rotate and when the rotation speed of the upper roll (2) is stable, driving the arc-shaped plate (4) to rotate around its rotational center by the drive component, so that the workpiece smoothly moves to rolling area for roll.

\* \* \* \* \*